June 8, 1926.
F. SCHAEFER
BRAKE HANGER AND SUPPORT
Filed May 9, 1923
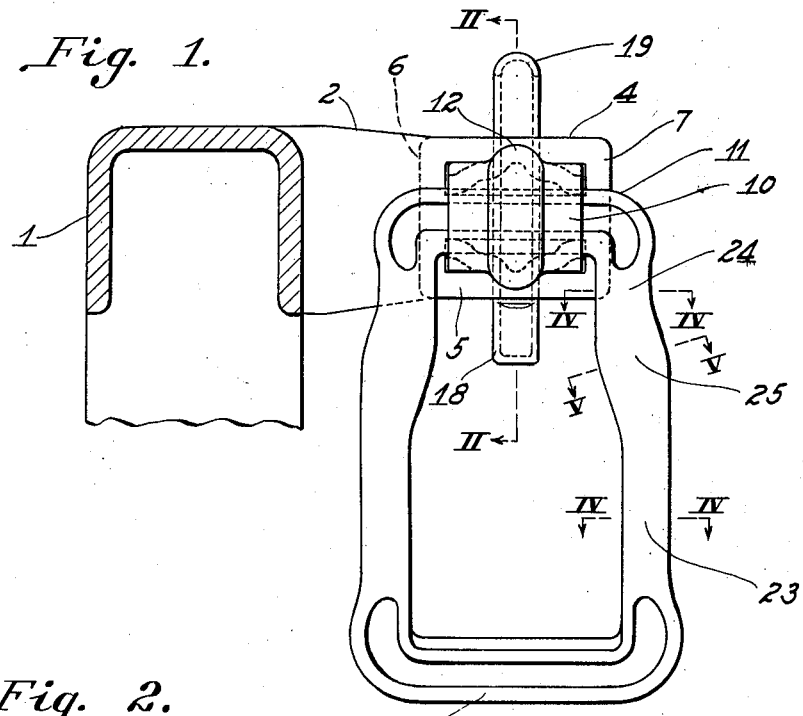
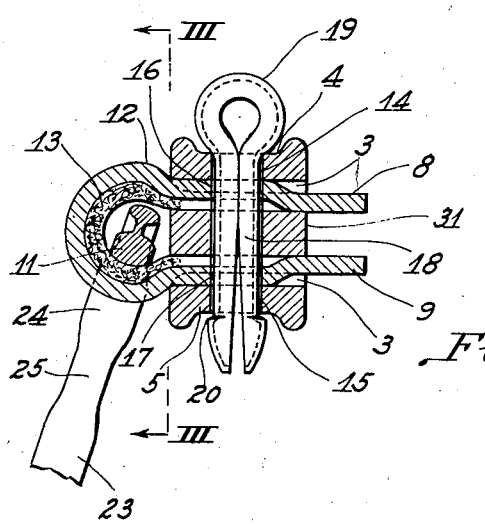
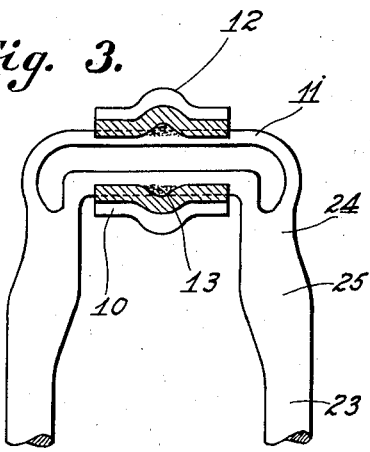
WITNESSES
INVENTOR
Frederic Schaefer,
by Winter & Brown,
his attorneys.

Patented June 8, 1926.

1,588,190

UNITED STATES PATENT OFFICE.

FREDERIC SCHAEFER, OF PITTSBURGH, PENNSYLVANIA.

BRAKE HANGER AND SUPPORT.

Application filed May 9, 1923. Serial No. 637,705.

The invention relates to brakes for railway cars, and has particularly to do with brake hangers and their attachment to truck frames.

An object of the invention is to provide means whereby a brake hanger, particularly one of the closed-link type, may be quickly and securely attached to a truck frame, and easily detached from it.

The invention is illustrated in the accompanying drawings, of which Fig. 1 is a face view of a brake hanger suspended from a truck side frame; Fig. 2 a sectional view taken on the line II—II, Fig. 1; Fig. 3 a sectional view taken on the line III—III, Fig. 2; and Figs. 4 and 5 transverse sectional views taken, respectively, on the lines IV—IV and V—V, Fig. 1.

In the practice of the invention a railway car truck frame is provided with a horizontally-disposed opening adapted to receive the ends of a stirrup which is shaped at its base or closed end to form a bearing for the upper yoke of a brake hanger, whether such yoke is formed of a separate pin or is an integral part of a closed-link brake hanger. The ends of the stirrup and the horizontal walls forming the stirrup-receiving opening are provided with registering vertically-disposed openings to receive a pin for connecting the stirrup and its supported brake hanger to the truck frame.

In the illustrative embodiment of the invention a truck frame 1 is shown as being provided with a laterally extending bracket 2 formed integrally with the frame and provided with a horizontally-disposed opening 3 formed by horizontal walls 4 and 5 and vertical walls 6 and 7. Opening 3 may be divided medially by a partition 31 extending between and formed integrally with walls 6 and 7. A stirrup, preferably of U-shape, has its ends or legs 8 and 9 arranged in opening 3, one above and the other below partition 31. The base 10 of the stirrup is of semi-cylindrical shape to form a bearing for an upper yoke 11 of a brake hanger, and may be provided with an outwardly extending projection 12 adapted to bear against one or both horizontal walls 4 and 5 to limit the inward movement of the stirrup. Preferably the stirrup is formed of a plate bent to the shape already explained, and the projection 12 is formed by an outwardly extending medial rib which affords an interior groove adapted to receive a body of graphite 13 or other lubricant for the bearing.

As previously indicated, the horizontal walls 4 and 5 and the ends of the stirrup are provided with registering openings to receive a connecting pin. Walls 4 and 5 are shown as being provided, respectively, with openings 14 and 15 and stirrup legs 8 and 9 with openings 16 and 17. Through these registering openings a pin 18 is inserted to hold the stirrup in position. While the connecting pin may be variously constructed, it is preferably a cotter pin formed of a pressed plate or bar having a head 19 at its upper end and lateral projections 20 at its lower end to hold the pin in position. The metal of which the pin is formed is sufficiently resilient to cause the lower ends of the pin to be held yieldingly outwardly beneath the lower face of wall 5. Other pins or types of cotter pins may of course be used if desired.

The attachment of a brake hanger to a truck frame according to this invention may be effected either before or after the hanger has been attached to a brake shoe and beam. Sometimes it is necessary to attach brake hangers to the shoes and beam before the hangers are attached to truck frames, and in such cases the improved connection is particularly convenient. In connecting a brake hanger to a frame, it is only necessary to place a stirrup around the upper yoke of the hanger, insert the ends of the stirrup in the opening of the frame bracket and drive or otherwise place a connecting pin downwardly through the several registering vertical openings to firmly connect the stirrup to the frame. The removal of a brake hanger is effective with equal ease by merely pressing together the lower ends of the connecting pin, removing it, and then withdrawing the stirrup.

The preferred brake hanger comprises an upper yoke 11, a lower yoke 22 extending parallel to but longer than the upper yoke, and off-set side members connecting the two yokes. Each side member preferably consists of end portions 23 and 24 which extend at right angles from the ends of the yokes, and an intermediate oblique portion 25. The end portions of the side members are, as shown in Fig. 4, of cylindrical cross-section, and the intermediate portions 25 are, as shown in Fig. 5, flattened in the general plane of the brake hanger. By thus flattening the intermediate portions, the brake hanger is formed for effectively resisting lateral strains, that is to say strains in the general plane of the hanger. The entire hanger may be formed from a cylindrical rod having its ends welded together, the hanger being forged to form the flattened intermediate portions 25 of the side members and to form specially shaped lower yokes, but the hanger is preferably forged and expanded from an integral blank in the manner disclosed in my pending application Serial No. 616,693. The cross-sectional area of the entire hanger is substantially uniform throughout, and the metal is so distributed that a minimum amount of it is required to properly resist all strains to which the hanger is subjected.

According to the provisions of the patent statutes, I have described the principle and operation of my invention together with the constructions which I now consider to represent the best embodiment of it. However, I desire to have it understood that, within the scope of the appended claims, the invention may be practiced by other forms of construction than those particularly illustrated and described.

I claim as my invention:

1. In a brake for railway cars, the combination of a truck frame provided with horizontally-disposed openings, a brake-hanger bearing stirrup having its ends in said openings, the horizontal walls forming said openings and the ends of said stirrup being provided with registering vertical openings, and a pin extending vertically through said vertical openings to connect the stirrup to the frame.

2. In a brake for railway cars, the combination of a truck frame provided with horizontally-disposed openings having a partition between them, a U-shaped stirrup forming at its base a brake-hanger bearing and having its ends in said openings one above and the other below said partition, the horizontal walls of said openings and the ends of said stirrup being provided with registering vertical openings, and a pin extending vertically through said vertical openings to connect the stirrup to the frame.

3. In a brake for railway cars, the combination of a truck frame provided with horizontally-disposed openings, a brake-hanger bearing stirrup consisting of a U-shaped plate having at its base an outwardly-projecting medial portion forming an interior lubricant groove and an exterior abutment adapted to bear against walls of said frame openings, the ends of the stirrup being in said openings, and means for connecting the stirrup to the frame.

4. In a brake for railway cars, the combination of a truck frame provided with horizontally-disposed openings, a U-shaped stirrup having its ends in said openings, a removable pin connecting the stirrup to the frame, and a closed-link brake hanger having its upper horizontal yoke arranged in the base of said stirrup.

In testimony whereof, I sign my name.

FREDERIC SCHAEFER.